(12) United States Patent
Karam et al.

(10) Patent No.: US 8,606,227 B2
(45) Date of Patent: Dec. 10, 2013

(54) SECURE ACCESS TO RESTRICTED RESOURCE

(75) Inventors: Gerald Michael Karam, Morristown, NJ (US); Alicia Abella, Morristown, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 248 days.

(21) Appl. No.: 12/564,647

(22) Filed: Sep. 22, 2009

(65) Prior Publication Data

US 2011/0070864 A1    Mar. 24, 2011

(51) Int. Cl.
*H04M 1/66* (2006.01)

(52) U.S. Cl.
USPC ........................ 455/410; 455/456.1

(58) Field of Classification Search
USPC ................................. 455/410, 411
See application file for complete search history.

(56) References Cited

U.S. PATENT DOCUMENTS

| | | | |
|---|---|---|---|
| 6,549,792 B1 | 4/2003 | Cannon | |
| 7,181,192 B2 | 2/2007 | Panasik | |
| 7,187,952 B2 | 3/2007 | Lin | |
| 7,430,439 B2 | 9/2008 | Griffin | |
| 7,630,522 B2 * | 12/2009 | Popp et al. | 382/115 |
| 8,219,063 B2 * | 7/2012 | Rogel et al. | 455/405 |
| 8,255,698 B2 * | 8/2012 | Li et al. | 713/186 |
| 2003/0163710 A1 * | 8/2003 | Ortiz et al. | 713/186 |
| 2004/0259591 A1 | 12/2004 | Grams | |
| 2006/0160521 A1 * | 7/2006 | Foucher | 455/403 |
| 2006/0218191 A1 * | 9/2006 | Gopalakrishnan | 707/104.1 |
| 2009/0132197 A1 | 5/2009 | Rubin | |
| 2009/0153288 A1 * | 6/2009 | Hope et al. | 340/3.1 |
| 2010/0130213 A1 * | 5/2010 | Vendrow et al. | 455/445 |
| 2010/0162386 A1 * | 6/2010 | Li et al. | 726/19 |
| 2010/0197352 A1 * | 8/2010 | Runstedler et al. | 455/566 |
| 2010/0248843 A1 * | 9/2010 | Karsten | 463/43 |
| 2010/0311390 A9 * | 12/2010 | Black et al. | 455/410 |
| 2010/0323657 A1 * | 12/2010 | Barnard et al. | 455/404.1 |
| 2010/0328074 A1 * | 12/2010 | Johnson et al. | 340/573.1 |
| 2011/0066374 A1 * | 3/2011 | Hartman et al. | 701/209 |
| 2012/0166696 A1 * | 6/2012 | Kallio et al. | 710/260 |

OTHER PUBLICATIONS

Sandip Agrawal et al, "PhonePoint Pen" Using Mobile Phones to Write in Air, published Aug. 17, 2009, accessed on Jun. 30, 2009 at http://synrg.ee.duke.edu/papers/phonepen.pdf , see all.
1800 Pocket PC "Don't Touch Me—Accelerometer Security App", published Jan. 22, 2009,accessed on Jun. 30, 2009 at http://www.1800pocketpc.com/2009/01/22/dont-touch-me-accelerometer-security-app.html , see all.
Epstein et al "Motion Sensing with Accelerometers—Present and Future", accessed Jun. 30, 2009, at http://www.cs.cornell.edu/Conferences/ASEE2006/ASEE%20Papers/Session%204/motion%20sensing%20applications_Epstein.pdf.

* cited by examiner

*Primary Examiner* — Marcos Batista
*Assistant Examiner* — Frank Donado
(74) *Attorney, Agent, or Firm* — Hartman & Citrin LLC

(57) ABSTRACT

Devices, systems and methods are disclosed which relate to restricting access to a secure resource by requiring a multimodal input sequence as a passkey to access the secure resource. Certain techniques allow a user to provide simultaneous input through a plurality of input sensors on a handheld device to create a multimodal input sequence, which is used as a unique passkey required to access secure resources. Combinations of input sensors are used to complete the multimodal input sequence. Among the available input sensors are an accelerometer, a touch screen, a camera, a proximity sensor, a position sensor, etc. The secure resource can be data or materials.

20 Claims, 7 Drawing Sheets

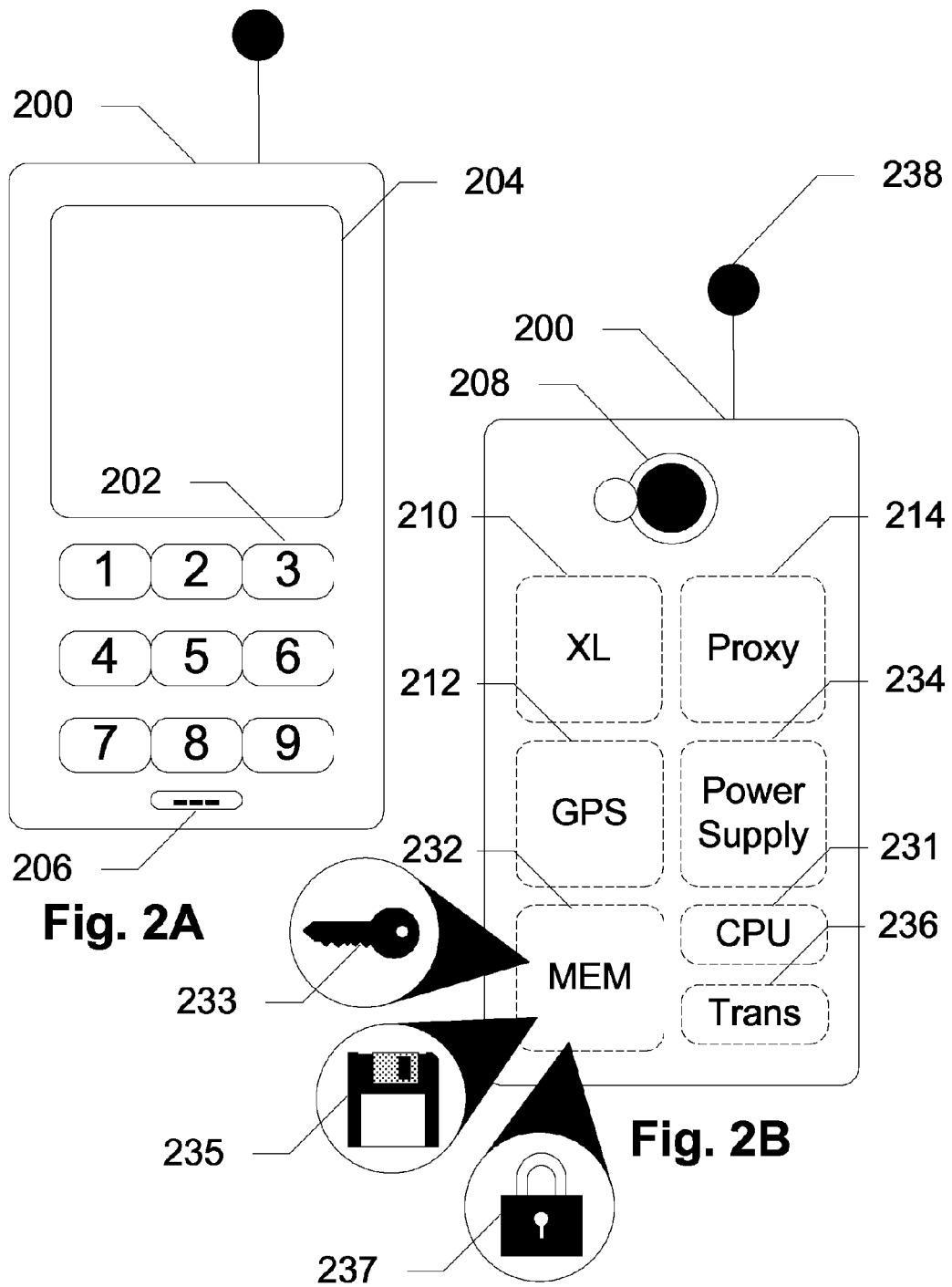

SECURE ACCESS TO RESTRICTED RESOURCE

BACKGROUND OF THE INVENTION

1. Field of the Invention

The present invention relates to device security. More specifically, the present invention relates to using a multimodal sequence to unlock a device.

2. Background of the Invention

Communications devices, such as cellular phones, have become a common tool of everyday life. Cellular phones are no longer simply used to place telephone calls. With the number of features available rapidly increasing, cellular phones are now used for storing addresses, keeping a calendar, reading e-mails, drafting documents, etc. With this wide range of features comes an even greater need for security. For instance, e-mails or documents may be private or privileged and need to be safe from unauthorized users. An unauthorized user picking up or stealing the cellular phone should not be able to access this private information.

Currently, cellular phones may be password protected through the keypad. The user sets up a password consisting of a series of keystrokes which must be re-entered to later access the cellular phone. These passwords can generally be any number of characters which the user will remember. Ideally, the password is challenging enough that an unauthorized user cannot simply guess the password and gain access.

A problem with using simply a keypad for password entry is the ability of others to determine the password without the user's knowledge. Someone may be able to see the user enter the password and easily be able to repeat it. Alternatively, an unauthorized user may simply be able to guess the password.

Biometric characteristics have become a more prevalent means of determining identity. Various branches of the United States government are using technology for recognition of fingerprints and faces. Other forms of biometrics include iris and finger vein recognition. Biometrics use unique characteristics of the human body as passkeys to secure resources, making forgery very complex. However, most biometric systems have a small false rejection rate and an even smaller, but much more consequential, false acceptance rate.

What is needed is access restriction which requires a unique, yet discreet input method.

SUMMARY OF THE INVENTION

The present invention provides devices and methods for restricting access to a secure resource by requiring a multimodal input sequence as a passkey to access the secure resource. Exemplary embodiments of the present invention allow a user to provide simultaneous input through a plurality of input sensors on a handheld device to create a multimodal input sequence, which is used as a unique passkey required to access secure resources. Combinations of input sensors are used to complete the multimodal input sequence. Among the available input sensors are an accelerometer, a touch screen, a camera, a proximity sensor, a position sensor, etc. The secure resource can be data or materials.

Furthermore, exemplary embodiments of the present invention feature telephones, PDAs, and standalone devices capable of multimodal input. The multimodal input sequence can be set by the user. For instance, a user may set the passkey by holding the device upright, then turning it to the side while touching the screen in the upper-right corner. An accelerometer reads the orientation transition of the device from upright to the side, and the touch screen reads the touch of the upper-right corner. Once the passkey is set, the user must perform the same multimodal input, i.e. turning the device to the side and touching the upper-right corner, in order to access the secure resource.

In one exemplary embodiment, the present invention is a handheld device for restricting access to a secure resource. The handheld device includes a plurality of input sensors, each generating an input signal, and the plurality generating a multimodal input sequence, a processor in communication with the plurality of input sensors, a memory in communication with the processor, a passkey, the passkey having a defined multimodal input sequence, stored on the memory, a secure data resource stored on the memory, and a security logic on the memory for comparing a multimodal input sequence with the passkey. Access to the secure resource is restricted unless the multimodal input sequence matches the passkey.

In another exemplary embodiment, the present invention is a security system. The security system includes a handheld device including a plurality of input sensors, each of the plurality of input sensors generating an input signal, and the plurality generating a multimodal input sequence, a server in communication with the handheld device, a memory on the server, a passkey, the passkey having a defined multimodal input sequence, stored on the memory, a security logic on the memory for comparing a multimodal input sequence with the passkey, a physical barrier in communication with the server, and a secure resource surrounded by the barrier. The server restricts access to the secure resource unless the multimodal input sequence matches the passkey.

In yet another exemplary embodiment, the present invention is a method for restricting access to a secure resource. The method includes recording an attempted multimodal input sequence on a handheld device having a plurality of input sensors by simultaneously manipulating the plurality of input sensors, comparing the attempted multimodal input sequence to a corresponding passkey, the passkey having a defined multimodal input sequence, and granting access to the secure resource if the attempted multimodal input sequence matches the corresponding passkey.

DESCRIPTION OF THE FIGURES

FIGS. 2A and 2B show a handheld device including a plurality of input sensors, according to an exemplary embodiment of the present invention

DETAILED DESCRIPTION OF THE INVENTION

Figure 1:
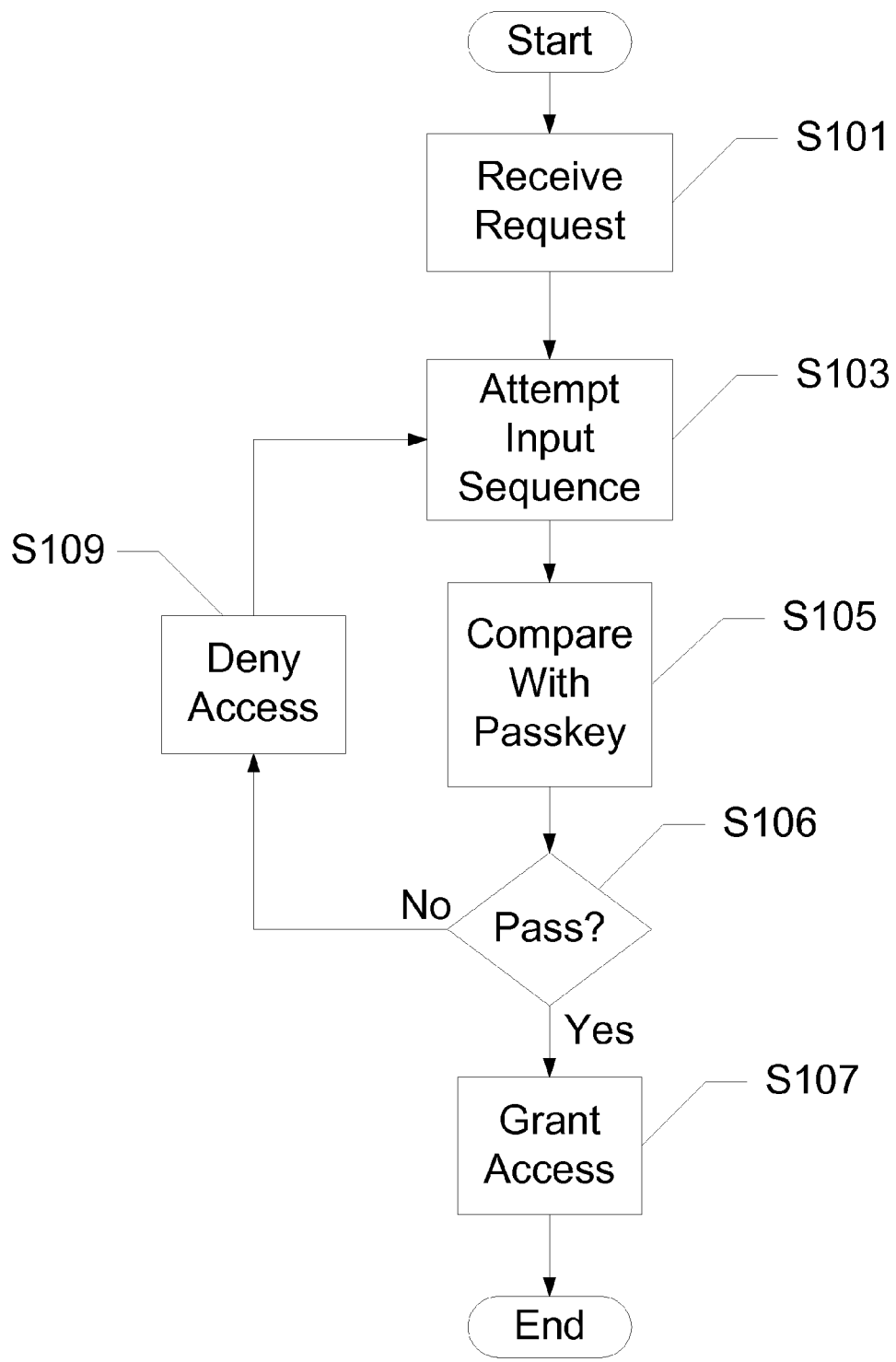
FIG. 1 shows a method for allowing access to a secure resource using a multimodal input sequence, according to an exemplary embodiment of the present invention.

The present invention provides devices, systems and methods for restricting access to a secure resource by requiring a multimodal input sequence as a passkey to access the secure resource. Exemplary embodiments of the present invention allow a user to provide simultaneous input through a plurality of input sensors on a handheld device to create a multimodal input sequence, which is used as a unique passkey required to access secure resources. Combinations of input sensors are used to complete the multimodal input sequence. Among the available input sensors are an accelerometer, a touch screen, a camera, a proximity sensor, a position sensor, etc. The secure resource can be data or materials.

Furthermore, exemplary embodiments of the present invention feature telephones, PDAs, and standalone devices capable of multimodal input. The multimodal input sequence can be set by the user. For instance, a user may set the passkey by holding the device upright, then turning it to the side while touching the screen in the upper-right corner. An accelerometer reads the orientation transition of the device from upright to the side, and the touch screen reads the touch of the upper-right corner. Once the passkey is set, the user must perform the same multimodal input, i.e. turning the device to the side and touching the upper-right corner, in order to access the secure resource.

For the purposes of this disclosure, the following apply. A handheld device is an electronic device including at least a CPU, a memory, a plurality of input sensors, and may include an interface port. The CPU is an electronic circuit that can execute a computer program or logic. The CPU further includes any modern-day microprocessor or combination of microprocessors with embedded graphics, sound, and other controllers. The CPU may be coupled to a power supply unit (PSU), and a memory. The memory stores, inter alia, computer programs and/or logic to control the plurality of input sensors, and the interface port. Logic to operate and manipulate the input sensors may alternatively be embedded within the sensors themselves, or within the CPU. The interface port may be wireless or wired, and is capable of communicating with a separate server directly or via a network. In the case of a wireless interface port, the handheld device may be a mobile communication device such as a cellular telephone or a Personal Digital Assistant (PDA).

An input sensor is a device within the handheld device that senses a state or condition of the handheld device or a user's input into the device. Typical input devices include keypads, touchscreens, and microphones. A touchscreen, as used herein and throughout this disclosure, refers to a display that can detect and locate a touch on its surface. Examples of types of touchscreen include resistive, which can detect many objects; capacitive, which can detect multiple touches at once; etc. Input sensors also include accelerometers, light sensors, position sensors, proximity sensors, and so on. Accelerometers include any microelectro-mechanical system (MEMS) tilt sensor, multi-axis, piezo-resistor, capacitive, inductive, gyroscopic, optical, or laser accelerometer typically included in modern portable electronic devices. Light sensors include CCD image sensors such as those found in digital cameras. Position sensors include Global Positioning System (GPS) or Assisted GPS (A-GPS) devices commonly found in modern cellular telephones. Proximity sensors include inductive or capacitive sensors found on digital cameras, cellular phones, and the like, and also include laser, RADAR, or Passive Infrared (PIR) sensors. Other input sensors will be apparent to one skilled in the art.

An input sensor generates an input signal. The input signal may be digital, or a digital conversion of a raw analog signal. Within each input signal there may be a particular input sequence. An input sequence comprises a combination of signals from one input sensor. When a plurality of input sequences from a plurality of input sensors is combined, the combination forms a multimodal input sequence. Visual depictions of multimodal input sequences are further disclosed in FIGS. 3 and 4.

Figure 5:
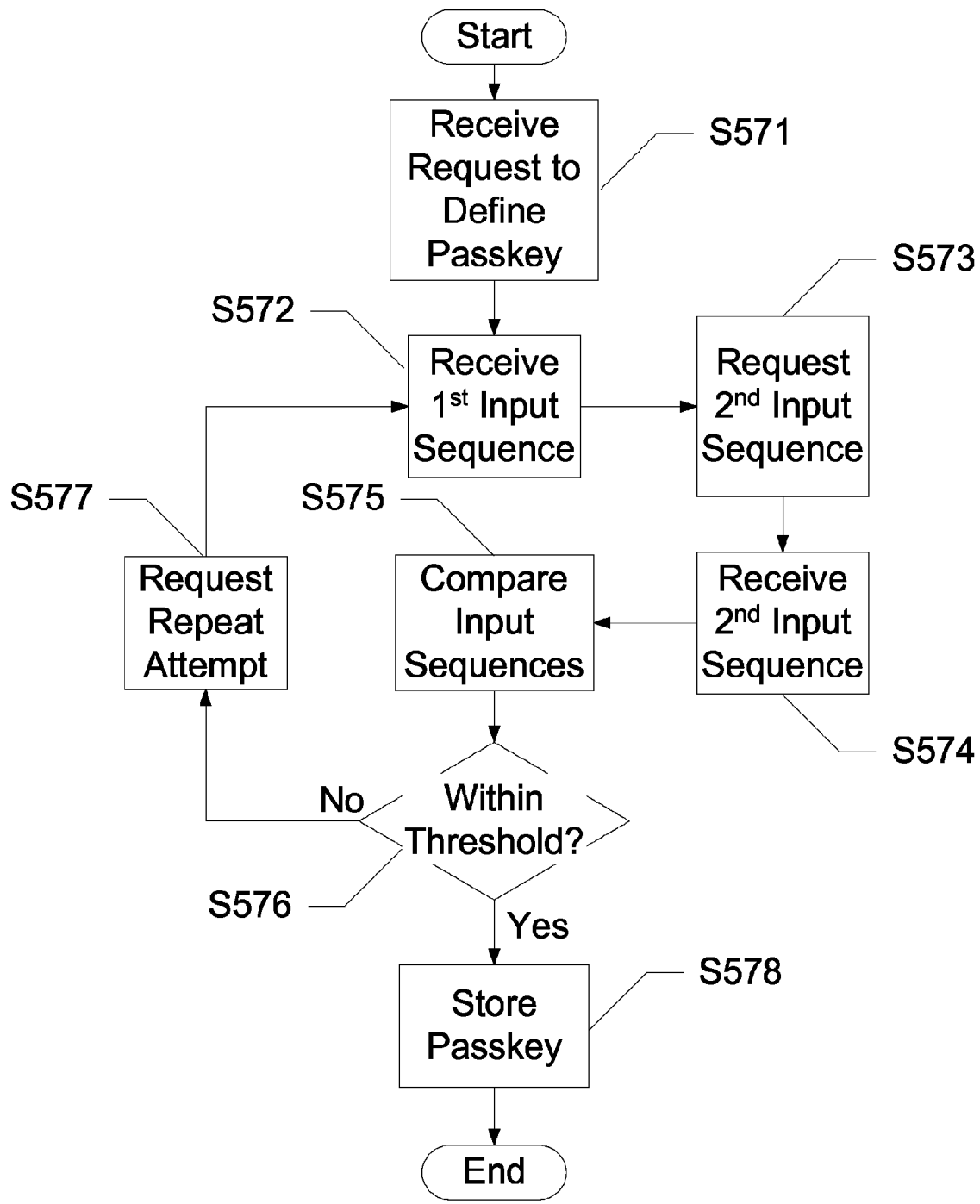
FIG. 5 shows a method for defining a multimodal input sequence, according to an exemplary embodiment of the present invention.

According to an exemplary embodiment of the present invention, a multimodal input sequence is used as a unique passkey to gain access to a secure resource. To achieve this functionality, a desired combination of input sequences is defined and stored as a multimodal input sequence corresponding to the security feature or secure resource. When this multimodal input sequence is defined by the manufacturer or provider of the device, it is termed a preset multimodal input sequence. Alternatively, a user may define their own passkey, termed a custom multimodal input sequence. Either the user or the provider/manufacturer may define the passkey in different ways. For instance, one may define the passkey by actually recording a series of inputs via the handheld device, and store the passkey as a recorded multimodal input sequence. Alternatively, one may define the passkey by programming a series of inputs via a user interface, and store the programmed passkey as a programmed multimodal input sequence. In other words, when recording a passkey the user is required to perform the same inputs, i.e. make the same motions, touch the screen correctly, etc., and when programming a passkey the user, for example, simply types a line of computer readable code. Combinations of the two defining methods are possible, and will be apparent to one skilled in the art in light of this disclosure. An exemplary method for defining a multimodal input sequence is shown in FIG. 5.

For the following description, it can be assumed that most correspondingly labeled structures across the figures (e.g., 132 and 232, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

FIG. 1 shows a method for granting access to a secure resource, according to an exemplary embodiment of the present invention. A request to access a secure resource is received (S101) at a handheld device or a server on a security system. The request is necessary to activate or trigger the recording of the attempted multimodal input sequence by a user. For instance, a user operating a handheld device submits a request for access to a secure resource, wherein the request is received (S101) by a security system that controls the access to the resource. Alternatively, the request may be received by an application on the handheld device itself. The request may be generated by running a command on the handheld device, or by opening an application on the device, or any means known in the art for accessing a secure resource.

Once the access is requested, the user of the handheld device attempts a multimodal input sequence (S103). As described herein, the user simultaneously performs a plurality of input sequences via the plurality of input sensors on the handheld device, wherein the combination of input sequences is temporarily stored as an attempted multimodal input sequence. This attempted multimodal input sequence is compared (S105) to a previously defined (either preset or custom) multimodal input sequence, or passkey. If the attempted multimodal input sequence matches the passkey, then access is granted (S107) to the secure resource. The comparison (S106) ensures that the plurality of input sequences within the attempted multimodal input sequence matches a corresponding plurality of input sequences in the passkey. If the comparison fails, i.e. if the attempted multimodal input sequence does not match the passkey to within a tolerance threshold, then access is denied (S109) and the user may re-attempt a multimodal input sequence (S103).

In alternate embodiments, a user may be given a maximum number of attempts before the handheld device is frozen, an alarm is raised, or a security level is elevated. Further, the matching step may include determining a match to within a tolerance threshold. This margin of error can be adjusted per input sensor, as different input sensors have different sensitivities. For instance, accelerometers can capture movements to an accuracy so distinct that it can be difficult for a user to duplicate his own motion exactly. However, a touch screen for a handheld device is relatively small, leaving fewer possibilities of touch placement and patterns, making it easier for a user to duplicate the input. Therefore, an accelerometer may benefit from a higher threshold, whereas a touch screen may benefit from a lower threshold. An overall threshold can be used as well, that applies to the overall multimodal input sequence. The margin of error may also be adjusted per other factors, such as the intended user of the system (disabled, elderly, etc.). The passkey is generally associated with one or more corresponding secure resources. The passkey is stored on a database that is on the security system or in communication with the handheld device.

FIGS. 2A and 2B respectively show the exterior and interior components of a portable security device 200 featuring a plurality of input sensors 202-214, according to an exemplary embodiment of the present invention. The plurality of input sensors includes a keypad 202, a touch screen 204, a microphone 206, a light sensor 208, an accelerometer 210, a position sensor 212, and a proximity sensor 214. Device 200 further includes a Central Processing Unit (CPU) 231, a memory 232, and a power supply 234. Device 200 also includes a transceiver 236 and an antenna 238. Input sensors 202-214 are coupled to CPU 231 and power supply 234. Input sensors 202-214 generate signals that are processed by CPU 231. Memory 232 stores the signals and/or the input sequences generated by input sensors 202-214. Memory 232 also stores a passkey 233, a secure data resource 237, and a logic 235 for comparing a multimodal input sequence with a passkey, such as the method in FIG. 1. Memory 232 may also store applications that control input sensors 202-214.

A user of device 200 desiring access to secure resources can attempt input sequences using each of sensors 202-214. For instance, keypad 202 allows a user to enter a sequence of numbers, letters, or symbols as all or part of a password sequence. The sequence may consist of the order of the key presses, as well as the timing of the key presses. Combinations of input methods using keypad 202 will be apparent to one skilled in the art. Touch screen 204 allows for an input based upon a user touching the screen. This may include drawing on the screen, making a motion or gesture on the screen, selecting numbers, letters, or symbols from a virtual keypad displayed on the screen, etc. Microphone 206 allows verbal commands to be used as part of a passkey. The voice command may be user-agnostic; alternatively, a voice recognition program may be used to compare the user's voice with a corresponding input sequence in a preset or custom multimodal input sequence. Light sensor 208 allows for a visual input. For example, a camera may take a picture of the user's face and match it with a saved sample using a facial recognition program, or a fingerprint sensor may detect a particular user's fingerprint and incorporate that signal into the multimodal input sequence. Accelerometer 210 allows the user to input physical movement or orientation of the device as part of the attempted multimodal input sequence. Accelerometer 210 may measure directions and magnitudes of movements and signal these as part of the multimodal input sequence. For instance, device 200 may need to be tilted at a specific angle as part of a passkey. Alternatively, a combination of specific motions may be needed to complete the attempted sequence. Location sensor/GPS 212 and proximity sensor 214 may be used to ensure that the password sequence only works when portable device is in a certain location. This location may be a physical location, a location relative to another device, a location relative to the user, etc. As defined earlier, input sensors 202-214 include any input device that is typically found on electronic devices such as cellular telephones, laptop computers, handheld computers, personal digital assistants (PDAs), etc. The exemplary embodiment of FIGS. 2A and 2B discloses a keypad 202, a touch screen 204, a microphone 206, a light sensor 208, an accelerometer 210, position sensor 212, and a proximity sensor 214; however, other input sensors may be apparent to one skilled in the art.

As defined above, a multimodal input sequence is created from a plurality of input sequences from the input sensors. Since each input sequence can be correlated with a defined input sequence, the plurality of input sequences generated by a user of a handheld device forms an attempted multimodal input sequence, which is compared to a passkey stored on a database.

Figure 3A:
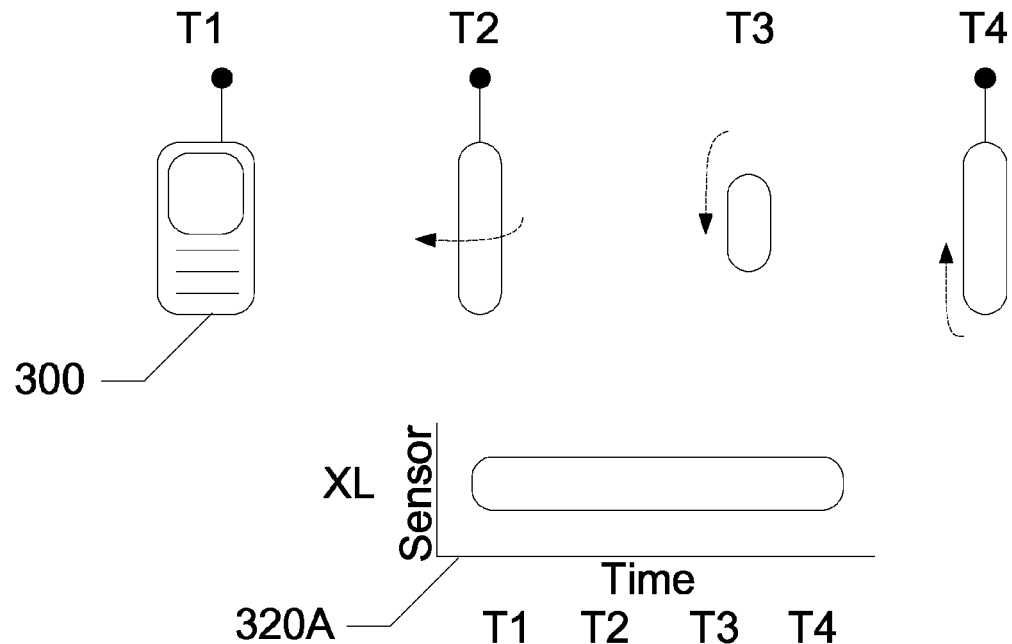
FIGS. 3A and 3B show a method for recording an input sequence from a plurality of input sensors, according to an exemplary embodiment of the present invention.

Recording attempted input sequences from a plurality of sensors is described in the exemplary embodiment of FIG. 3A. A user moves the handheld device 300 in a series of specific motions in a particular combination, while an accelerometer records the motions. For instance, the user rotates device 300 from an initial position at a first time T1 to a clockwise direction at a second time T2, points the top of the device forward at a third time T3, and points rotating the device back at a fourth time T4. The accelerometer detects the changes of the position and the motion of the device, and temporarily stores the input sequence as represented in graph 320A. Graph 320A is a visual representation of the signal generated by the accelerometer as a function of time, according to an exemplary embodiment of the present invention. Other representations of an accelerometer signal are possible, and will be apparent to one skilled in the art. The signal of graph 320A may include the direction and magnitude of the motions as well as the timing of the motion. In graph 320A, the bar is solid to show a continuous motion, i.e. the accelerometer is detecting constant motion.

Figure 3B:
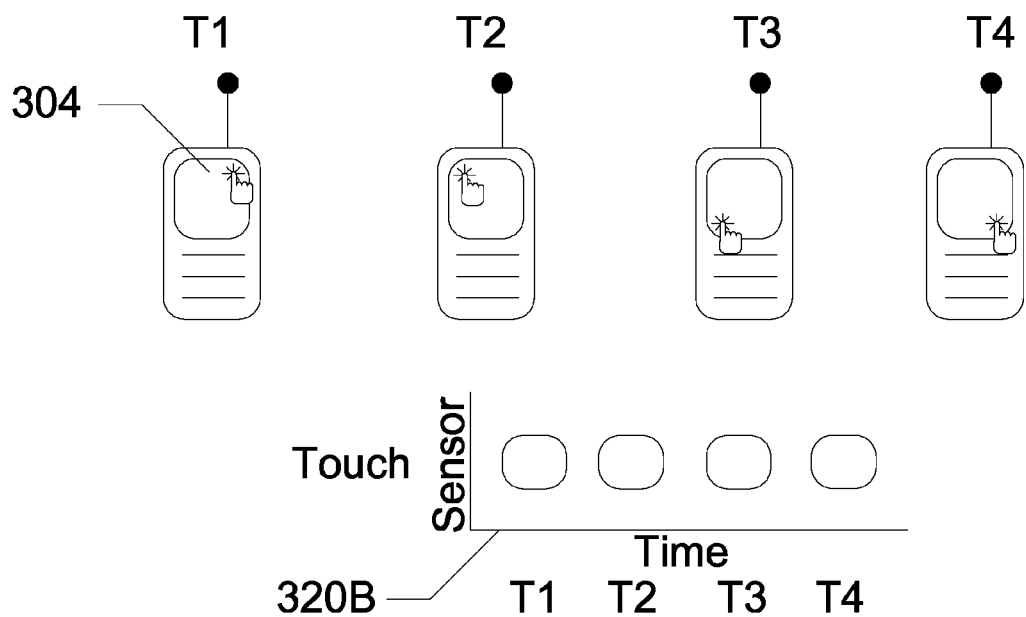

The user combines the measurements recorded by the accelerometer simultaneously with another sensor on device 300, specifically, touchscreen 304. The touchscreen input sequence is shown in FIG. 3B. A user touches the top right corner of the touchscreen at time T1, moves his finger to the top left at time T2, touches the bottom left corner at a time T3, and the bottom right corner at time T4. Touch screen detects the finger taps and generates the signal represented in graph 320B. This signal may include a location, a movement, an amount of pressure, etc., and is plotted with respect to time. Graph 320B is a visual representation of the signal generated by the touchscreen as a function of time, according to an exemplary embodiment of the present invention. In graph 320B, the bar is broken to show discrete motions, i.e. the touchscreen is detecting individual touches with pauses in between. Graphs 320A and 320B may be combined to generate a multimodal input sequence. If the multimodal input signal generated by each of these motions and presses matches the defined passkey, access to the secure resource is granted.

Figure 4:
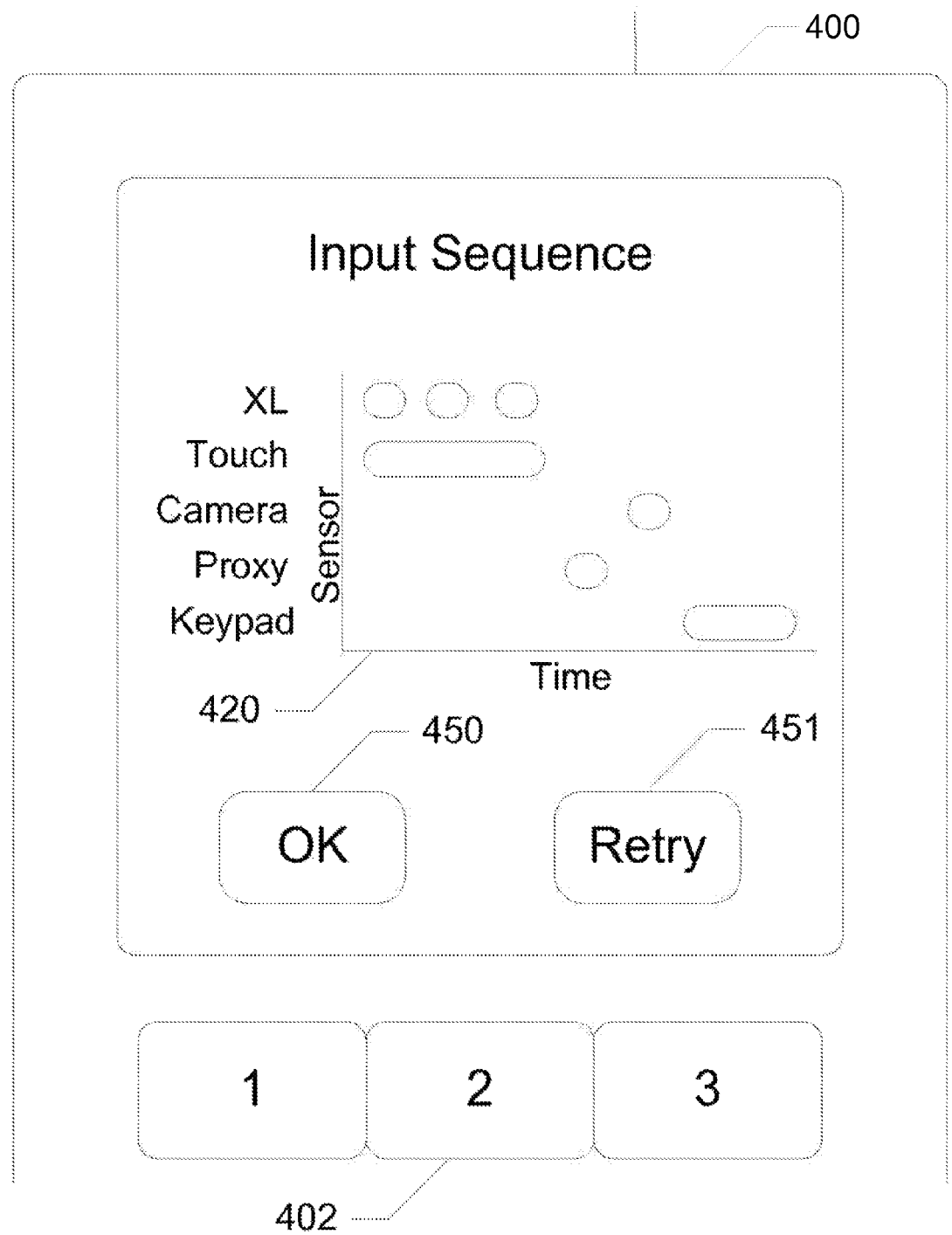
FIG. 4 shows a graphic representation of an attempted multimodal input sequence, according to an exemplary embodiment of the present invention.

FIG. 4 shows graphical representation of an attempted multimodal input sequence, according to an exemplary embodiment of the present invention. The graph shows the signals from each of the inputs plotted with respect to time. These signals include movements recorded by the accelerometer, touches detected by the touch sensor, light or image detections by the camera, presence detections by the proximity sensor, and key presses all with respect to time. For instance, in addition to the accelerometer and touchscreen signals, an image is taken by the camera, and a user speaks his name into device 400. This could potentially invoke a voice detection or a voice biometric security measure stored within the passkey. Further, the user may input a password via keypad 402 as a final layer of security for the multimodal input sequence. Consequently, the multimodal input sequence involves the user tilting device 400 at a particular angle, drawing a shape with his finger on the touchscreen, holding the camera up to his face, speaking his name, and entering a password. Device 400 stores the five input sequences as an attempted multimodal input sequence, and compares this to a passkey that is stored on the memory. A match between the two multimodal input sequences would allow the user access to a corresponding secure resource. The OK button 450 allows the user to review the multimodal sequence to determine if the desired sequence was recorded before it is compared to the server. A Retry button 451 allows the user to re-enter the multimodal input sequence if all of the inputs on the chart are not correct. In a related embodiment described in FIG. 5, the graphical representation allows a user to review a custom multimodal input sequence before it is defined and associated with a secure resource.

Before a multimodal input sequence is attempted, a multimodal input sequence needs to be defined as a passkey, and associated with the corresponding secure resource. The passkey is the passkey that subsequent attempted multimodal input sequences are compared against in order to determine whether access to a secure resource is granted or denied. As described above, the passkey may be defined by the manufacturer or provider of the device (preset multimodal input sequence) or by a user of the device (custom multimodal input sequence). Further, one may define the passkey by actually recording a series of inputs via the handheld device, or by programming a plurality of input sequences via a user interface as a set of instructions. In addition, the chart of FIG. 4 may be utilized during the defining of a multimodal input sequence such that a user can determine whether there were any unintended inputs.

FIG. 5 shows a method for defining a multimodal input sequence by recording a series of inputs via a handheld device, according to an exemplary embodiment of the present invention. The method begins with a device or server on a security system receiving a request to define a passkey (S571). The request may be submitted by a manufacturer or service provider at the time of provisioning the security system, or by a user who wishes to customize the passkey. In either case, a multimodal input sequence is performed and received by the system, and temporarily stored (S572). The system requests a second multimodal input sequence (S573) to verify accuracy. A user/provider repeats the gestures from S572 and the two multimodal input sequences are compared (S575). If the two multimodal input sequences are similar to within a tolerance threshold (S576), a passkey is generated that matches the multimodal input sequences. The passkey may be generated from the first, second, or an average of both sequences from S572 and S574. If, however, the two input sequences are not similar to within the tolerance threshold, the process has to be repeated (S577).

Figure 6:
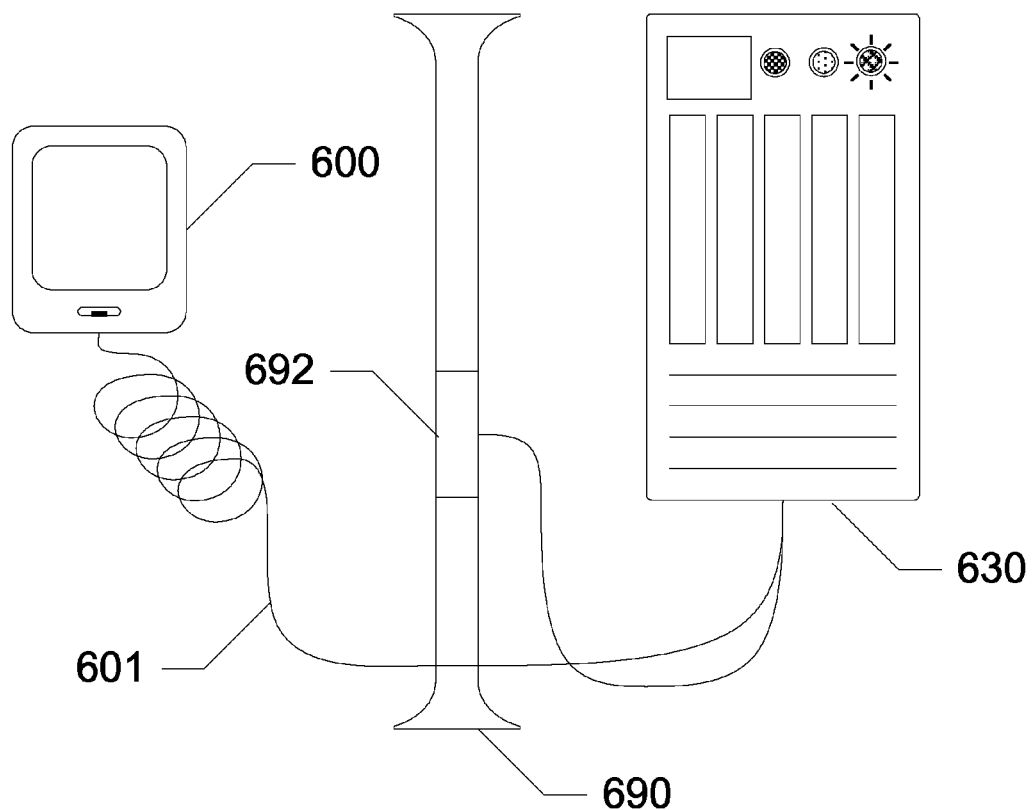
FIG. 6 shows a system for restricting access to a secure resource, according to an exemplary embodiment of the present invention.

FIG. 6 shows a system for restricting access to a secure resource, according to an exemplary embodiment of the present invention. The system uses a handheld device 600 for generating the multimodal input sequence. Device 600 communicates with server 630 on the security system via cable 601. Server 630 is in communication with a lock 692 which secures a door 690 from unwanted access. Lock 692 contains a servo which is capable of locking and unlocking lock 692 upon command from server 630.

A user manipulates handheld device 600 to enter a multimodal input sequence. A signal comprised of the measurements of the multimodal input sequence is sent to server 630 where it is compared with a saved multimodal input sequence to determine whether the correct sequence has been entered. If the entered and saved sequences match, then server 630 sends a signal to the servo which moves lock 692 from a locked position to an unlocked position, allowing access. If the entered and saved sequences do not match, then the user may be prompted to enter the correct multimodal input sequence. Alternatively, the system may suspend such that access is not allowed for a period of time or until some event.

Figure 7A:
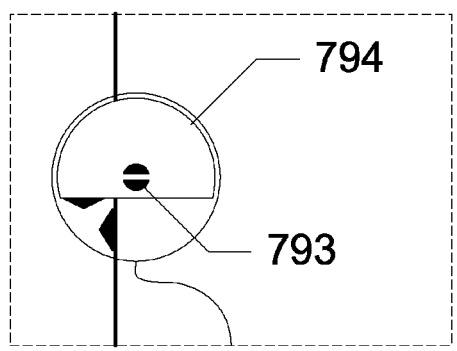
FIGS. 7A and 7B show a close-up view of the lock and servo, according to an exemplary embodiment of the present invention.
Figure 7B:
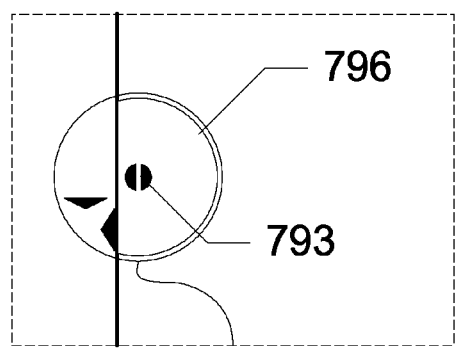

FIGS. 7A and 7B show a close-up view of the lock and servo, according to an exemplary embodiment of the present invention. FIG. 7A shows the lock in a locked position 794. Servo 793 remains inactive until activated by the server. Once activated, servo 793 turns the lock until it reaches the position in FIG. 7B. In an unlocked position 796, the door can be opened.

The exemplary embodiment in FIG. 6 shows one example of access restriction to a physical resource. The barrier is a door with a swivel-type lock in this embodiment while other embodiments feature vaults with complex locking mechanisms. Other embodiments place more features on the handheld device such as wireless technology instead of having a physical wire running from the handheld device. In another exemplary embodiment a handheld device, as in FIG. 2, communicates a multimodal input sequence across a BLUETOOTH wireless connection to a server as in FIG. 6. The server receives the multimodal input sequence and compares it with the passkey to determine access. In the embodiments where the handheld device wirelessly communicates with the server all communication is encrypted for greater security.

In an alternative embodiment, the handheld device also stores the saved multimodal input sequence and compares the entered sequence with the stored sequence. The handheld device then sends a signal to the server or entry system informing the server whether the correct multimodal input sequence has been entered.

Figure 8A:
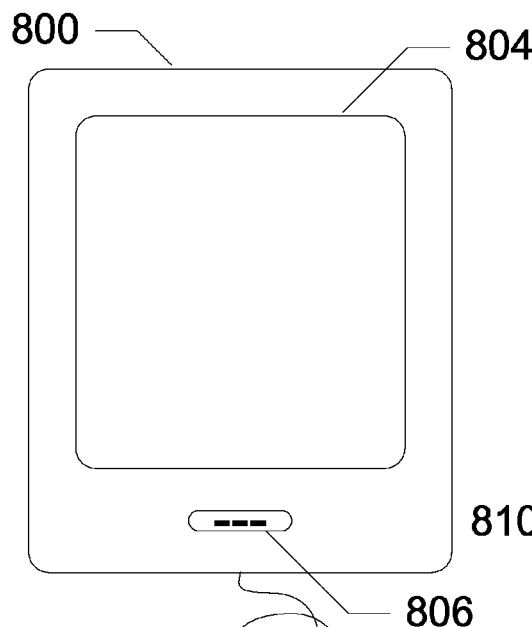
FIGS. 8A and 8B show a handheld device as well as its internal components, according to an exemplary embodiment of the present invention.
Figure 8B:
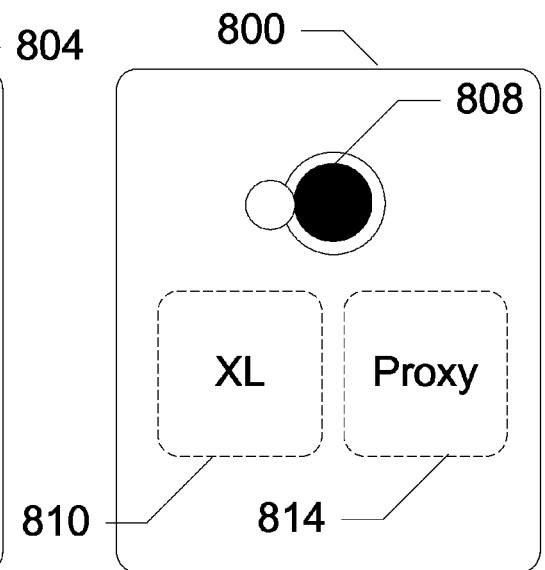

FIGS. 8A and 8B show a handheld device 800 as well as its internal components, according to an exemplary embodiment of the present invention. In this embodiment, handheld device 800 is wired to the server and is used to input a multimodal input sequence to the server. Handheld device 800 includes a touch screen 804, an accelerometer 810, a proximity sensor 814, a camera 808, and a microphone 806. Each of these input sensors allows for an input as part of the multimodal input sequence.

Figure 9A:
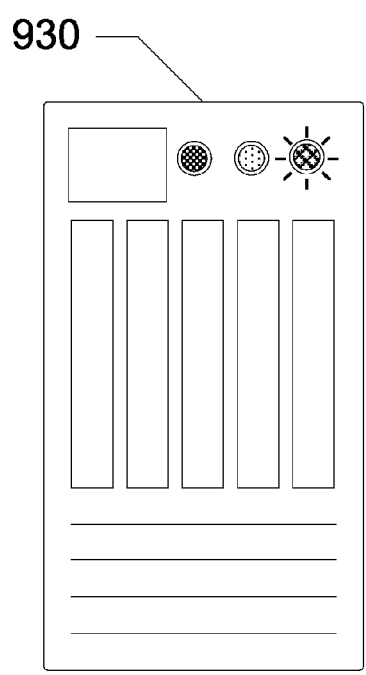
FIGS. 9A and 9B show a server as well as its internal components, according to an exemplary embodiment of the present invention.
Figure 9B:
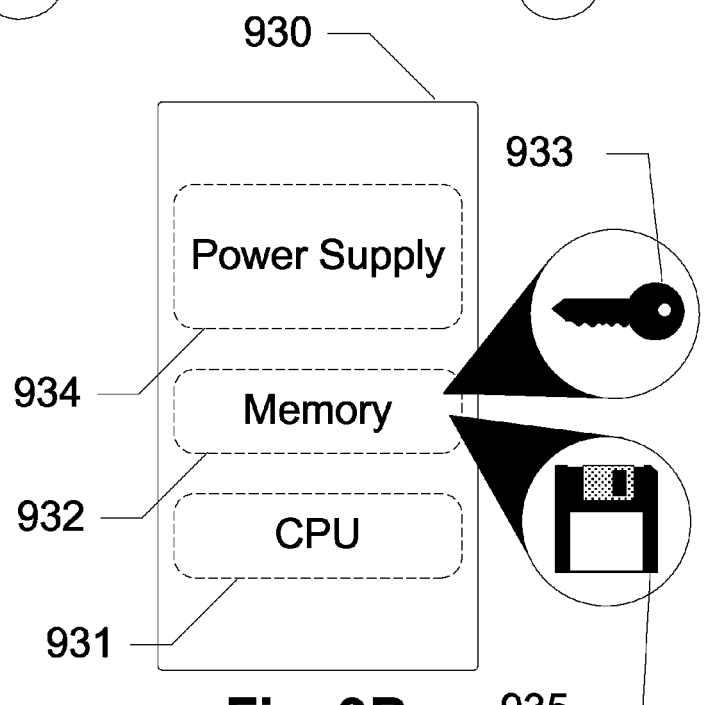

FIGS. 9A and 9B show a server 930 as well as its internal components, according to an exemplary embodiment of the present invention. The measurements from each of the input sensors of the handheld device are sent to a CPU 931 of the server 930. Server 930 uses logic 935 to compare a multimodal input sequence with a passkey 933, both of which are saved on a memory 932, to determine whether the correct multimodal input sequence has been entered. A power supply 934 provides power to memory 932 and CPU 931 as well as the components of the handheld device in wired embodiments.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A handheld device comprising:
  a plurality of input sensors, the plurality of input sensors comprising an accelerometer, a touchscreen, and a location sensor, the plurality of input sensors generating a plurality of input signals, the plurality of input signals comprising a motion signal generated by the accelerometer, an orientation signal generated by the accelerometer, a touch signal generated by the touchscreen in response to a touch input, and a location signal generated by the location sensor;
  a processor; and
  a memory that stores a secure resource and a security logic, the security logic comprising instructions that, when executed by the processor, cause the processor to perform operations comprising
    receiving a multimodal input sequence from the plurality of input sensors, the multimodal input sequence comprising the motion signal, the orientation signal, the touch signal, and the location signal, wherein the motion signal and the orientation signal are indicative of a transition of the handheld device from a first orientation to a second orientation, the touch signal is indicative of the touch input provided while the transition of the handheld device from the first orientation to the second orientation occurs, and the location signal is indicative of a location of the handheld device while the touch input is provided and while the transition of the handheld device from the first orientation to the second orientation occurs,
    comparing the multimodal input sequence with a passkey stored on the memory to determine whether the multimodal input sequence matches a defined multimodal input sequence comprised in the passkey, and
    restricting access to the secure resource stored on the memory unless the multimodal input sequence matches the defined multimodal input sequence comprised in the passkey.

2. The handheld device of claim 1, wherein the multimodal input sequence further comprises input signals generated from a relative position and a global position, the relative position being a position of the handheld device relative to another device.

3. The handheld device of claim 1, wherein the security logic further comprises a further instruction that, when executed by the processor, causes the processor to perform a further operation comprising determining that the multimodal input sequence matches the defined multimodal input sequence comprised in the passkey within a tolerance threshold.

4. The handheld device of claim 1, wherein the multimodal input sequence further comprises input signals generated from a relative position and a global position, the relative position being a position of the handheld device relative to a user.

5. The handheld device of claim 1, further comprising a transceiver, wherein the transceiver comprises a cellular radio frequency transceiver, a WIFI transceiver, or a BLUETOOTH transceiver.

6. The handheld device of claim 5, wherein the handheld device communicates, via the transceiver, with a server that is in communication with a physical barrier to control access to the physical barrier.

7. The handheld device of claim 6, wherein the physical barrier is opened after the security logic causes the processor to determine that a match exists between the multimodal input sequence and defined multimodal input sequence comprised in the passkey.

8. A security system comprising:
  a handheld device comprising a plurality of input sensors, the plurality of input sensors comprising an accelerometer, a touchscreen, and a location sensor, the plurality of input sensors generating a plurality of input signals, the plurality of input signals comprising a motion signal generated by the accelerometer, an orientation signal generated by the accelerometer, a touch signal generated by the touchscreen in response to a touch input, and a location signal generated by the location sensor; and
  a server in communication with the handheld device, the server comprising a memory that stores a secure resource and a security logic, the security logic comprising instructions that, when executed by the processor, cause the processor to perform operations comprising
    receiving a multimodal input sequence from the plurality of input sensors, the multimodal input sequence comprising the motion signal, the orientation signal, the touch signal, and the location signal, wherein the motion signal and the orientation signal are indicative of a transition of the handheld device from a first orientation to a second orientation, the touch signal is indicative of the touch input provided while the transition of the handheld device from the first orientation to the second orientation occurs, and the location signal is indicative of a location of the handheld device while the touch input is provided and while the transition of the handheld device from the first orientation to the second orientation occurs,
    comparing the multimodal input sequence with a passkey stored on the memory to determine whether the multimodal input sequence matches a defined multimodal input sequence comprised in the passkey, and restricting access to the secure resource unless the multimodal input sequence matches the defined multimodal input sequence comprised in the passkey.

9. The security system of claim 8, wherein the multimodal input sequence further comprises input signals generated from a relative position and a global position, the relative position being a position of the handheld device relative to another device or relative to a user.

10. The security system of claim 8, wherein the handheld device further comprises a device transceiver and the server further comprises a server transceiver, and wherein the device transceiver and the server transceiver enable communication between the handheld device and the server.

11. The security system of claim 8, wherein the security logic further comprises a further instruction that, when executed by the processor, causes the processor to perform a further operation comprising determining that the multimodal input sequence matches the defined multimodal input comprised in the passkey within a tolerance threshold.

12. A method comprising:
recording, by a handheld device comprising a processor, an attempted multimodal input sequence comprising a plurality of input signals comprising a motion signal, an orientation signal, a touch signal, and a location signal, the attempted multimodal input sequence being recorded on the handheld device having a plurality of input sensors, the plurality of input sensors comprising an accelerometer, a touchscreen, and a location sensor, wherein the motion signal and the orientation signal are indicative of a transition of the handheld device from a first orientation to a second orientation, the touch signal is indicative of a touch input provided via the touchscreen while the transition of the handheld device from the first orientation to the second orientation occurs, and the location signal is indicative of a location of the handheld device while the touch input is provided and while the transition of the handheld device from the first orientation to the second orientation occurs;

comparing, by the handheld device, the attempted multimodal input sequence to a passkey to determine whether the attempted multimodal input sequence matches a defined multimodal input sequence comprised in the passkey; and if the handheld device determines that the attempted multimodal input sequence matches the defined multimodal input sequence comprised in the passkey, granting, by the handheld device, access to a secure resource.

13. The method of claim 12, wherein comparing the attempted multimodal input sequence to the passkey is performed to within a tolerance threshold.

14. The method of claim 12, further comprising:
receiving a request to define the passkey;
recording a first temporary multimodal input sequence;
requesting a second temporary multimodal input sequence;
recording the second temporary multimodal input sequence;
determining that the first temporary multimodal input sequence matches the second temporary multimodal input sequence; and
storing the temporary multimodal input sequence as the passkey.

15. The method of claim 14, further comprising associating the passkey with the secure resource.

16. The method of claim 12, wherein the secure resource is secured by a physical barrier.

17. The method of claim 16, wherein granting access to the secure resource comprises one of unlocking and opening the physical barrier.

18. The method of claim 16, wherein the handheld device further comprises a transceiver.

19. The method of claim 12, wherein the secure resource is data.

20. The method of claim 19, wherein granting access to the secure resource comprises enabling access to the secure resource.

* * * * *